United States Patent [19]

Bernhardt et al.

[11] 4,375,221
[45] Mar. 1, 1983

[54] ADJUSTABLE SUPPORT FOR CONCAVES

[75] Inventors: Richard P. Bernhardt, Leola; Everett C. Cowan, Jr., Parksburg, both of Pa.

[73] Assignee: Sperry Corporation, New Holland, Pa.

[21] Appl. No.: 272,222

[22] Filed: Jun. 10, 1981

[51] Int. Cl.³ .............................................. A01F 12/28
[52] U.S. Cl. .................................. 130/27 S; 130/27 T
[58] Field of Search ................... 130/27 S, 27 L, 27 T; 56/14.6

[56] References Cited

U.S. PATENT DOCUMENTS 2,616,433  11/1952  Anderson ........................... 130/27 S
3,631,862  1/1972  Rowland-Hill ..................... 130/27 T
3,957,058  5/1976  Komancheck ..................... 130/27 S Primary Examiner—Jay N. Eskovitz
Attorney, Agent, or Firm—Larry W. Miller; Frank A. Seemar

[57] ABSTRACT

The problem of adjusting the relative position of concaves and rotors is accomplished without shims by providing adjustable members engaged with sidewalls of a combine and threaded into opposite ends of a concave support member.

12 Claims, 4 Drawing Figures

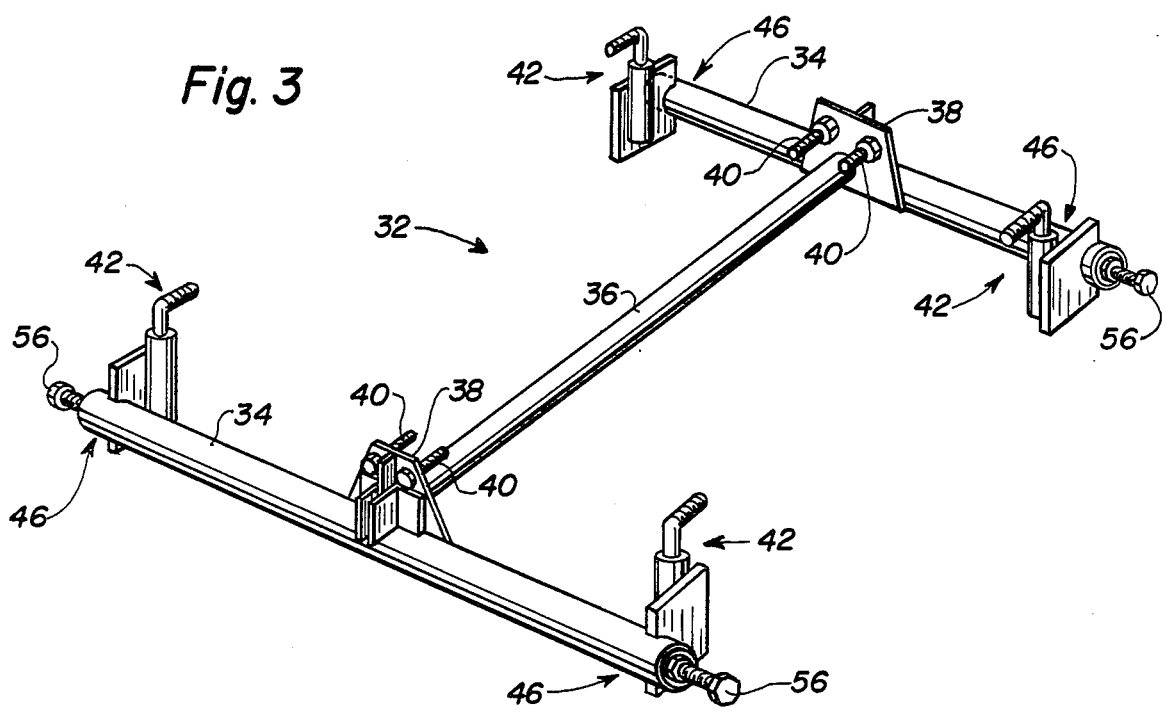
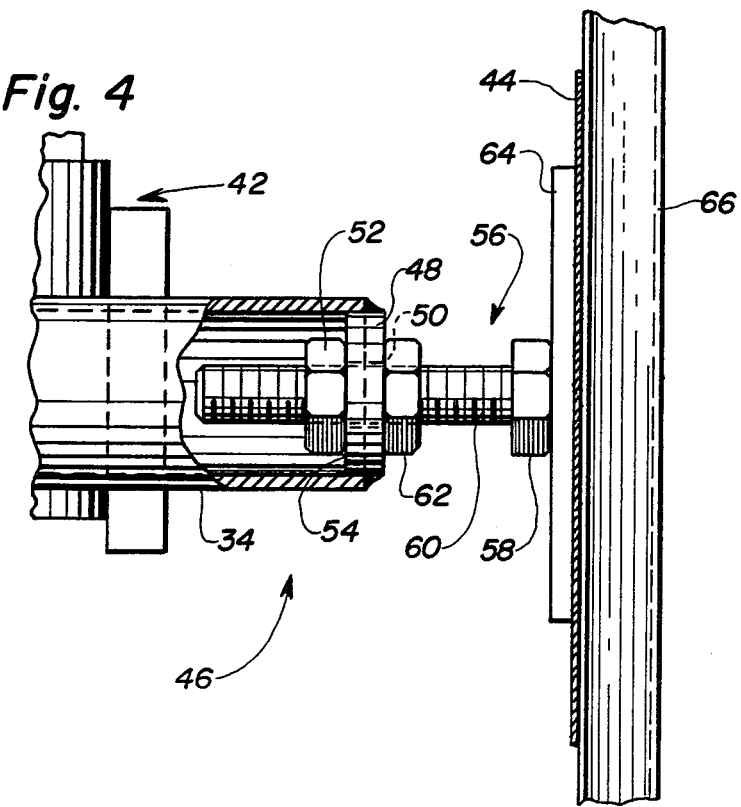

ADJUSTABLE SUPPORT FOR CONCAVES

BACKGROUND OF THE INVENTION

This invention relates generally to threshing machines of the rotor type and more particularly to those having concaves with adjustable sections.

Threshing concaves for axial flow type combines must be positioned properly relative to the fixed center of the rotating threshing rotors to insure proper threshing. This positioning is usually accomplished with shims placed between the opposite ends of the concave support member and the sidewalls of the combine.

A limitation of using shims is that they are time consuming and difficult to install and remove. Another limitation is that shim plates must be stocked and maintained for those instances when it becomes necessary to reposition the threshing concaves relative to the threshing rotors.

The foregoing illustrates limitations of the known prior art. Thus, it is apparent that it would be advantageous to provide an alternative directed to overcoming one or more of the limitations as set forth above. Accordingly, a suitable alternative is to provide a concave support which is readily adjustable without the need for shims.

SUMMARY OF THE INVENTION

In one aspect of the present invention, this is accomplished by providing an adjustable support for concaves including opposite ends and an adjustable member threaded into each end. Each adjustable member is engaged with sidewalls of the combine. As a result, the adjustable members can be moved toward and away from the opposite ends thus moving the support and the concaves mounted thereon.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 3 is an isometric illustration of an embodiment of the concave support means of this invention; and FIG. 4 is a partial front elevation illustrating an embodiment of the adjustable member of this invention.

DESCRIPTION OF THE PREFERRED EMBODIMENT

Figure 1:
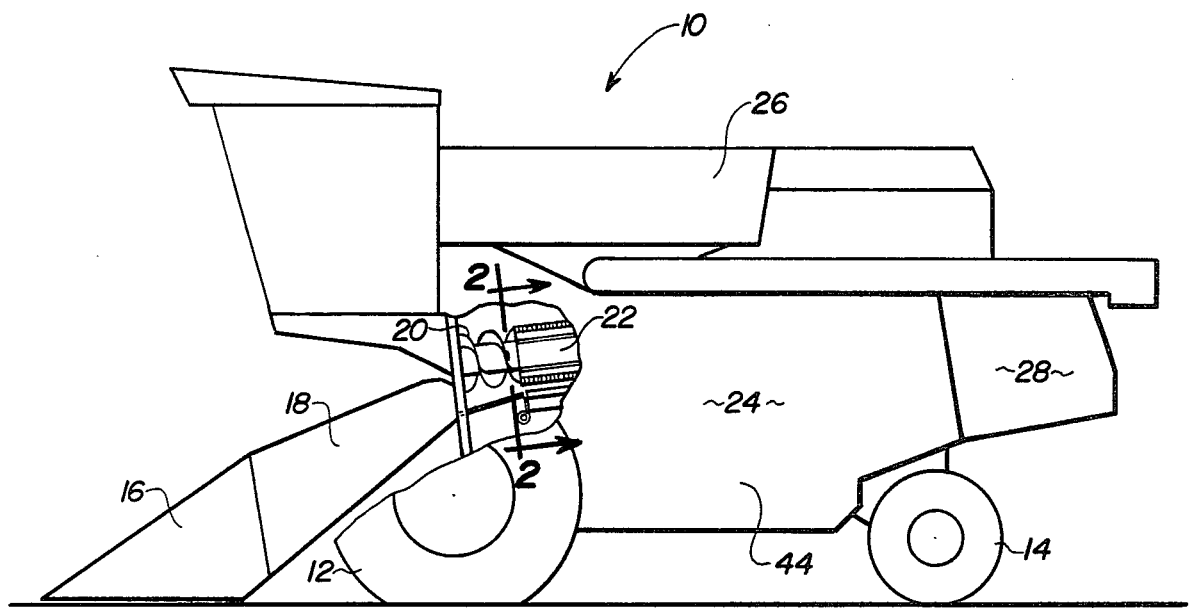
FIG. 1 is a side elevation view illustrating an exemplary combine of the axial flow type to which the present invention is applicable.

FIG. 1 illustrates a commercially available combine 10 rendered mobile by a pair of forward drive wheels 12 and a pair of smaller diameter rear wheels 14. Mounted on the forward end of the combine, as illustrated, is a header 16 which cooperates with an elevator 18 for delivering cut crop material, which is to be threshed and separated, to augers 20 which are mounted on the forward ends of rotors 22. The rotors 22 are rotatably mounted within a threshing and separating compartment 24. The threshed and separated grain is conveyed by a suitable conduit to a grain bin 26 supported above compartment 24. Stalk and/or vine material, from which seeds have been threshed, is discharged through a discharge end 28 of combine 10.

Figure 2:
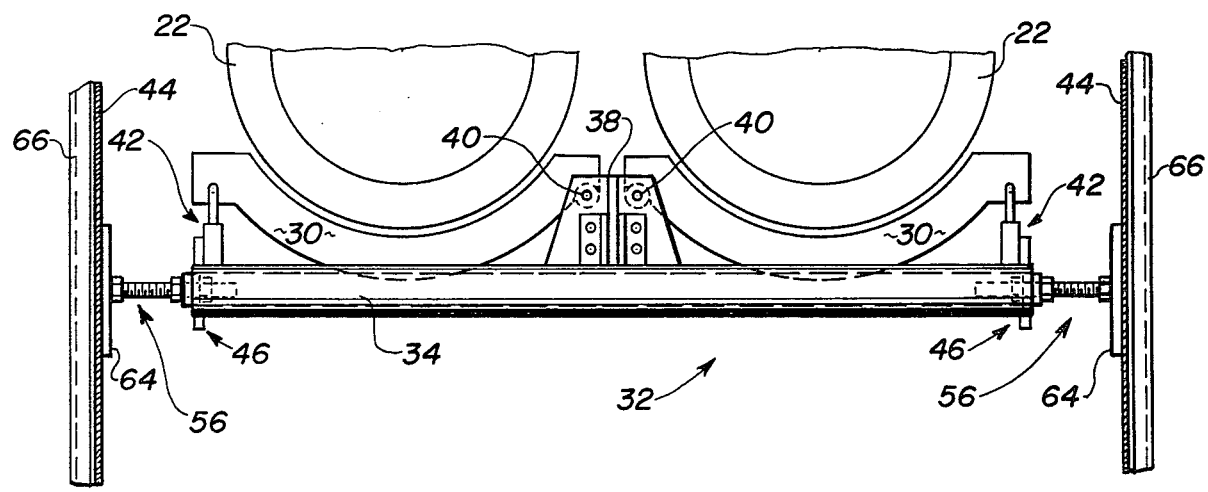
FIG. 2 is a partial frontal view illustrating an embodiment of two side-by-side axial flow type rotors spaced in proximity with their respective concaves which are supported by support means.

In FIG. 2, the forward or threshing ends of rotors 22 coact in spaced proximity with the forward or threshing ends of concaves 30. A space 31 between rotors 22 and concaves 30 is the region wherein threshing occurs. In the type of combine to which the present invention preferably pertains, a pair of rotors 22 are mounted in side-by-side relationship and the same respectively coact with a pair of side-by-side concaves 30. The rearward or separating ends of rotors 22 and concaves 30 (not shown) are well known and understood to be supported within compartment 24.

Concaves 30 are supported by support means 32, also shown in FIG. 3. Support means 32 is a generally "H" shaped structure formed of a pair of tubular steel support members 34 joined by an interconnecting tubular steel member 36. A pair of available steel brackets 38, positioned at opposite ends of members 36, are provided for interconnecting support means 32 and concaves 30 at pins 40. Additional brackets 42, also available, are provided for interconnecting another portion of concaves 30 and support means 32. Brackets 42 also provide for vertical alignment of concaves 30 relative to support means 32.

Means are provided for adjusting the position of support means 32 between a pair of spaced sidewalls 44 of compartment 24 for moving the position of concaves 30 from side-to-side relative to rotors 22. The adjusting means, best illustrated in FIGS. 2, 3 and 4, includes the support members 34 each having opposite ends 46. Preferably welded to each end 46 is a steel cap 48 having an aperture 50. A threaded receptacle such as a nut 52 is preferably welded to one side 54 of cap 48 inside tubular member 34.

The adjusting means also includes an adjustable member such as a bolt 56, or the like, having a head 58 engaged with each of the sidewalls 44, and having a threaded shaft 60 extending through aperture 50 of cap 48 and into threaded engagement with nut 52. In this manner, bolts 56 are movable toward and away from opposite ends 46 of members 34. Preferably, means such as a jam nut 62, are provided in threaded engagement with shaft 60 for being jammed into engagement with cap 48 for securing the position of bolt 56 between head 58 and nut 52.

Since the sidewalls 44 of compartment 24 are relatively flexible, it is preferable to have head 58 engaged with a reinforcing steel plate 64 on one side of wall 44 aligned with a reinforcing channel member 66 on an opposite side of wall 44.

With the parts assembled as set forth above, it can be appreciated that cooperative movement of bolts 56, toward and away from ends 46 of members 34, can adjust the relative position of support means 32 between walls 44 thus moving the position of concaves 30 relative to rotors 22.

The foregoing has described a concave support means which is readily adjustable without the need for using undesirable shims.

It is anticipated that aspects of the present invention, other than those specifically defined in the appended claims, can be obtained from the foregoing description and the drawings.

Having thus described the invention, what is claimed is:

1. A combine harvester comprising:
an axial flow rotor rotatably mounted in the combine about an axis of rotation;
a threshing concave in spaced proximity with the rotor;
means for supporting the concave in the combine, said support means including a support member having opposite ends and being movable toward and away from said rotor parallel to said axis of rotation such that the spacing between said rotor and said concave can be varied in a direction extending radially from said axis of rotation, each of said opposite ends including a threaded receptacle and an adjustable member threadably received within the corresponding threaded receptacle for adjustable movement toward and away from the corresponding opposite end to be movably engageable with side walls of said combine and be operable to adjustably move said support member in a direction generally perpendicular to said side walls for centering said concave relative to said rotor and to permit a movement of said support member generally parallel to said side walls to vary the spacing between said rotor and said concave along the direction extending radially from said axis of rotation.

2. The harvester of claim 1 wherein each opposite end includes a threaded receptacle and each adjustable member includes a threaded shaft.

3. The harvester of claim 1 including a jam nut threadably mounted on said adjustable member.

4. A combine harvester of the type including an axial flow rotor rotatably mounted in the combine, a threshing concave in spaced proximity with the rotor and means for supporting the concave, the improvement comprising:
means for adjusting the position of said support means between opposing side walls of said combine for moving the position of said concave relative to said rotor by moving said support means relative to said side walls, said adjusting means including a threaded receptacle in opposite ends of said support means, an adjustable member slidably engaged with said opposing side walls to permit a movement of said support means substantially parallel to said opposing side walls for varying the spacing between said rotor and said concave without changing the relative position of said support means with respect to said side walls, each adjustable member being threaded into each receptacle for movement toward and away from said opposite ends, and means for securing the position of the adjustable member relative to the opposite ends.

5. The combine harvester of claim 4 wherein the adjustable member includes a head end engaged with said side walls and having a threaded shaft end extending into said receptacle.

6. The combine harvester of claim 5 wherein the means for securing the position of the adjustable member is a jam nut threadably mounted on said shaft between the head end and the receptacle.

7. In a combine having a frame supporting opposing side walls; a threshing rotor mounted on said frame for rotation about an axis of rotation; a concave supported on said frame in spaced proximity to said rotor; and a support member mounting said concave and extending substantially between said side walls, the improvement comprising:
adjustment means adjustably received within said support member and movably engaged with said opposing side walls for adjustably laterally positioning said concave with respect to said rotor by laterally positioning said support member relative to said opposing side walls, said adjustment means also permitting a movement of said support member parallel to said side walls to vary the spacing between said rotor and said concave by moving said concave toward and away from said axis of rotation.

8. The combine of claim 7 wherein said adjustment means includes a threaded receptacle in opposing ends of said support member adjacent the respective said side walls and an adjustable member threaded into each respective threaded receptacle for movement toward and away from said support member, each said adjustment member engaging the respective said side wall for sliding movement thereon, the movement of said adjustment members relative to said support member effecting said lateral movement of said concave, said adjustment members remaining in slidable engagement with said side walls.

9. The combine of claim 8 wherein said adjustment means further includes means for securing the position of said adjustable members relative to said support member.

10. The combine of claim 9 wherein said support member is an H-shaped member having four ends, two of which are positioned adjacent each respective said side wall, each said end mounting one of said threaded receptacles and a corresponding said adjustment member.

11. The combine of claim 10 wherein each said adjustment member includes a threaded shaft received within the corresponding said threaded receptacle and terminating in a head engaged with the respective said side wall, said means for securing being a jam nut threadably mounted on the shaft of each of said adjustment member.

12. The combine of claim 11 further having a pair of axial flow rotors extending in a generally longitudinal direction within said combine, said support member supporting a pair of concaves in spaced proximity to said pair of rotors, said adjustment means being operable to center said concaves relative to said rotors.

* * * * *